PRIORITY CIRCUIT FOR A COMPUTER FOR GENERAL PURPOSES

Filed Jan. 17, 1966 5 Sheets-Sheet 1

INVENTORS
FRANZ J. SCHRAMEL
HANS VAN KAMPEN
BY
Frank R. Trifari
AGENT

PRIORITY CIRCUIT FOR A COMPUTER FOR GENERAL PURPOSES

Filed Jan. 17, 1966 5 Sheets-Sheet 2

INVENTORS
FRANZ SCHRAMEL
HANS VAN KAMPEN
BY
Frank R. [signature]
AGENT

INVENTORS
FRANZ SCHRAMEL
HANS VAN KAMPEN
BY
Frank R. Trifari
AGENT

INVENTORS
FRANZ SCHRAMEL
HANS VAN KAMPEN
BY
Frank R. Trifari
AGENT

INVENTORS
FRANZ SCHRAMEL
HANS VAN KAMPEN
BY
Frank R. Trifari
AGENT

United States Patent Office 3,491,339

Patented Jan. 20, 1970

3,491,339

PRIORITY CIRCUIT FOR A COMPUTER FOR GENERAL PURPOSES

Franz Josef Schramel and Hans Van Kampen, Hilversum, Netherlands, assignors to U.S. Philips Corporation, New York, N.Y., a corporation of Delaware

Filed Jan. 17, 1966, Ser. No. 520,971
Claims priority, application Netherlands, Jan. 16, 1965, 6500562
Int. Cl. G11b *13/00*
U.S. Cl. 340—172.5 1 Claim

ABSTRACT OF THE DISCLOSURE

The invention is a priority circuit for a computer which receives random requests for instructions, each stored as a series of programs. The circuit interrupts an instruction at the end of a program in favor of an instruction of greater priority, and continues the interrupted instruction at the conclusion of all higher priority instructions.

The invention relates to a priority circuit for a computer for general purposes. The need for such a circuit arrangement arises when the computer must be capable of interrupting a process under execution in behalf of a process with a greater urgency or, as is usually said in telecommunication technology, in behalf of a process which has priority over the process under execution. This situation occurs inter alia when the computer is used as a signal-handling center with a more or less large number of connections. In a comparatively simple case the function of the computer is to transmit received telegrams to the desired location. The computer performs the task by transmitting a code group (which may be identified with a letter, punctuation mark, digit or other symbol) received through an incoming line to a given location of the memory and then transmitting it from the memory location to the desired outgoing line (or lines). The signal transport through the incoming and outgoing lines usually takes place in a sequential form (that is to say code element after code element), whereas the signal transport in the computer itself takes place in a simultaneous or parallel form (that is to say code group after code group). The incoming and outgoing lines are therefore connected to the computer through incoming and outgoing line repeaters. In these line repeaters which may be of known construction the conversion takes place from the sequential into the parallel form, or conversely. At the same time the signal in line repeaters is brought into the form required for further transport, which form in the computer generally differs from that for the lines.

To perform a task as briefly described above, the computer must be capable of performing a number of special, usually rather short programs. In addition, the computer must contain in its instruction list a few special instructions consisting of rather short microprograms. These programs can be stored in known manner previously in the memory of the computer. Such a program is started by reading the memory location in which the first instruction of the program concerned is stored, for which reason said memory location will be termed the start location of the program concerned. When a memory location is read in which an instruction of the program is stored, the control circuit of the computer ensures that after performance of the instruction the memory location in which the next instruction of the program is stored is automatically read. By reading the last instruction or stop instruction of the program a signal is produced as a result of which the control circuit of the computer knowns that the program concerned has been fully carried out.

Examples of programs of the type meant here are:

(1) The transmission of a code group ready in an incoming line repeater to an assigned memory location, (2) The transmission of a code group stored in a memory location to an assigned outgoing line repeater, (3) The analysis of an address at the beginning of a telegram, (4) The analysis of certain office code groups (for example "beginning of telegram," "end of telegram," "delay," and so on), (5) The reservation of a group of memory locations (termed memory block) in behalf of an incoming line, and so on, and so on.

Of course, the nature of the programs depends upon the special function which the computer has to fulfill and upon the manner in which it performs the function. However, particulars and details of the programs are of no importance for the invention for which reason they will not be further discussed here.

What is of importance, however, is the fact that the performance of some of those programs has a greater urgency than the performance of others of those programs. For example, the program which consists of a single instruction for the transportation of a code group which is ready in an incoming line repeater to a memory location has a greater urgency than, for example, a program for analyzing an address. In fact, when the transport program is given no priority over all the other programs, the possibility exists that a code group which is ready in an incoming line repeater has not yet been transmitted to the memory at the instant that it is the turn of the next code group to be transported. It is also possible that the group is being received, as a result of which the code group to be transported would be over-written by a code group received later. For a program for the transport of a code group from a memory location to an outgoing line repeater an analogous remark holds good for corresponding reasons. So the transport programs have a greater urgency than the other programs, in other words, the computer must be constructed so that the transport programs have priority over all the other programs.

It may further be desirable to construct the computer so that the various programs are divided into groups, all the programs of a first group having priority over the programs of all the other groups, all the programs of a second group having priority over the programs of all the other groups with the exception of the programs of the first group, and so on. In this case the programs may be arranged in groups with decreasing priority. All the programs of the same group may either have the same priority or be arranged themselves also in a row with decreasing priority.

The priority which a program has over another program may be of a double nature which, in analogy with the distinguishing strong and weak criteria for extreme values in the calculus of variations, will be distinguished as strong and weak priority.

A program $x$ has a strong priority over a program $y$ when a program $y$ under execution is interrupted in behalf of a program $x$ and is replaced by the program $x$ as soon as a request for the program $x$ is received. However, an instruction which is in course of execution is always first fully executed. In case of a simultaneous request for a program $x$ and a program $y$, the program $x$ is started.

A program $x$ has a weak priority over a program $y$ when in case of a simultaneous request for a program $x$ and a program $y$ the program $x$ is started, without, however, a program $y$ in course of execution being ever interrupted in behalf of a program $x$.

When a number of programs, $x, y, z, u$ . . . have the same priority, likewise two cases may present themselves, namely: (1) when a program of the group is executed, it is the turn of the program following next in a cyclic sequence. When for example, the program $y$ is under execution and meanwhile requests are received for the programs $x$ and $u$, the program $u$ is started as soon as the program $y$ is executed, and the program $x$ is started only after the program $u$ has likewise been executed completely. This sequence is maintained independent of the fact whether the program $x$ was requested sooner or later than the program $u$, (2) when a program of the group is executed, it is the turn of the program which was requested first. In this case the circuit arrangement must contain a memory in which the sequence of receiving the requests is remembered which results in a somewhat greater complication of the circuit arrangement than in the case 1.

The component of the computer which, after the execution of every instruction, determines which program must be started or resumed is termed the priority circuit arrangement of the computer and it is this particular component to which the invention relates.

In order that the invention may readily be carried into effect one embodiment thereof will now be described in greater detail, by way of example, with reference to the accompanying drawings, in which.

Figure 1:
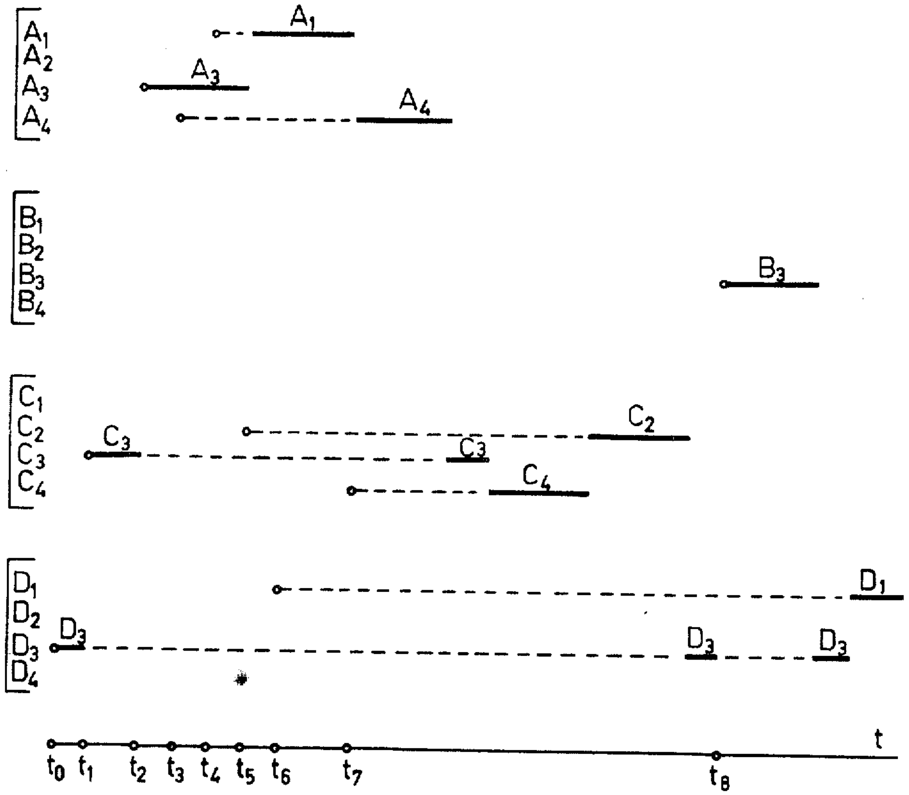
FIG. 1 is a diagram to explain the nature of the priorities.

FIG. 1 is a time diagram which serves to give an insight in the nature of the functions which the priority circuit has to perform. In this figure it is assumed that there are four groups of four programs each. The programs of group A have a strong priority over the programs of the groups B, C and D. The programs of the group B have a strong priority over the programs of the groups C and D. The programs of the group C have a strong priority over the programs of the group D.

In the group A the program $A_1$ has a weak priority over the programs $A_2$, $A_3$ and $A_4$, the program $A_2$ has a weak priority over the programs $A_3$ and $A_4$ and the program $A_3$ has a weak priority over the program $A_4$.

In the groups B, C and D none of the programs has any priority over any of the others. They are executed in a cyclic sequence and are independent of the sequence in which the requests concerned were received. Of course it is alternatively possible to execute the programs in the same group in the sequence in which the requests concerned were received. However, this requires somewhat more apparatus since in this case the said sequence will have to be remembered.

Let it be assumed that initially no program is in course of execution and that at the instant $t_0$, $t_1$, $t_2$, $t_3$, $t_4$, $t_5$, $t_6$, $t_7$ and $t_8$ requests are received for the programs $D_3$, $C_3$, $A_3$, $A_4$, $A_1$, $C_2$, $D_1$, $C_4$ and $B_3$. The program $D_3$ is then started at the instant $t_0$. However, at the instant $t_1$ said program is interrupted because then a request for program $C_3$ is received and the programs of the group C all have a strong priority over the programs of the group D. So at the instant $t_1$ the program $D_3$ is stopped and the program $C_3$ is started. This program, however, is interrupted in turn at the instant $t_2$ because then a request for the program $A_3$ is received and the programs of the group A all have a strong priority over the programs of the group C. At the instant $t_2$ the program $C_3$ is consequently stopped and the program $A_3$ started, which program cannot be interrupted since it belongs to the groups with the highest priority.

Before the program $A_3$ is fully executed at the instant $t_5$ requests were received for the program $A_4$ (at $t_3$) and $A_1$ (at $t_4$), so that after execution of the program $A_3$ the program $A_1$ is started (because in the group A the program $A_1$ has priority over the program $A_4$) and after execution of the program $A_1$ the program $A_4$ is started.

Before the program $A_1$ is fully executed, however, a request for the program $C_2$ was received at the instant $t_5$, a request for the program $D_1$ was received at the instant $t_6$ and a request for the program $C_4$ was received at the instant $t_7$.

At the instant at which the program $A_4$ is executed, the following programs are to be considered for execution:

(1) The non-executed program $C_3$ and $D_3$ (2) The programs $C_2$, $C_4$ and $D_1$ which were not yet started.

Of these programs, however, first those of the group C are executed because said group has priority over the group D. Because further none of the programs of the group C has priority over any other program of the same group and a fortiori no strong priority, first the interrupted program $C_3$ is again resumed and executed. As soon as the program $C_3$ is fully executed, the program $C_4$ is started because cyclically it succeeds the program $C_3$. So this is effected in spite of the fact that the request for the program $C_2$ was received sooner than that for the program $C_4$. As soon as the program $C_4$ also is fully executed, the program $C_2$ is started.

At the instant at which the program $C_2$ is fully executed, the still non-executed program $D_3$ and a request for the program $D_1$ are to be considered for execution. Because in the group D also none of the programs has any any priority over any of the others, the program $D_3$ is resumed again. But at the instant $t_8$ this program is interrupted again because then a request for the program $B_3$ is received and the group B has priority over the group D. At the instant $t_8$ the program $D_3$ consequently is stopped for the second time and the program $B_3$ is started. As soon as this program is fully executed, the program $D_3$ is resumed again and now executed. As soon as the program $D_3$ is fully executed, the program $D_1$ is started.

Requests for executing programs may be received both from the in- and output apparatus (incoming and outgoing line repeaters, drum memories, tape memories, readers, writers, and so on) and from the control circuit of the computer. The priority circuit receives the said data in the form of request signals. The way in which the said request signals are formed is of no significance for the invention and will consequently not be described here.

When a program has to be interrupted it is not practical to do this during an instruction but at the end of a fully executed instruction. For short instructions requiring only one or two pulse cycles of the computer something else is hardly feasible. For longer instructions requiring three or more pulse cycles, this measure is practical, because when a program is interrupted during an instruction the program (consisting of a single instruction) for temporarily storing all the data required for resuming the program necessarily becomes more complicated and as a result longer. Therefore the gain in time, if any, is minimum and is outweighed by the drawback of the greater complication which the realization of this possibility would involve.

Figure 2:
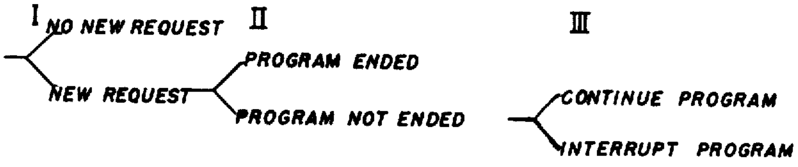
FIG. 2 is the decision diagram of the circuit arrangement according to the invention.

The decision of which program an instruction has to be executed next is consequently made after execution of every instruction. It is easy to see that for this purpose, for example, the following dichotomic decision diagram may serve (see also FIG. 2):

I

There are no new or unexecuted requests.
There are new or unexecuted requests.

II

The instruction just executed is the last of a program.

The instruction just executed is not the last of a program.

III

The program in course of execution must not be interrupted.

The program in course of execution must be interrupted.

The decisions must always be made at an instant that an instruction is just fully executed. The signal which is identified with this information is supplied by the control circuit of the computer.

In order to be able to make a decision at the level I, the priority circuit must start a bookkeeping of the requests received and write off the executed requests. This latter is done on the basis of a decision on the level II.

The decision on the level II is effected most practically on the basis of a signal supplied by the control circuit of the computer which signal indicates whether the instruction just executed is the last of a program or not. It is true, the priority circuit could derive this datum also from data supplied to it previously as regards the lengths of the various programs and the above mentioned bookkeeping, but this would require quite a lot of additional material, while the datum can without any difficulty and without noteworthy loss of time be derived from the program itself. In addition, the said other solution would involve complications when a program is replaced by another, for example shorter, program.

The decision on the level III may be made on the basis of data derived from the bookkeeping kept up by the priority circuit.

Figure 3:
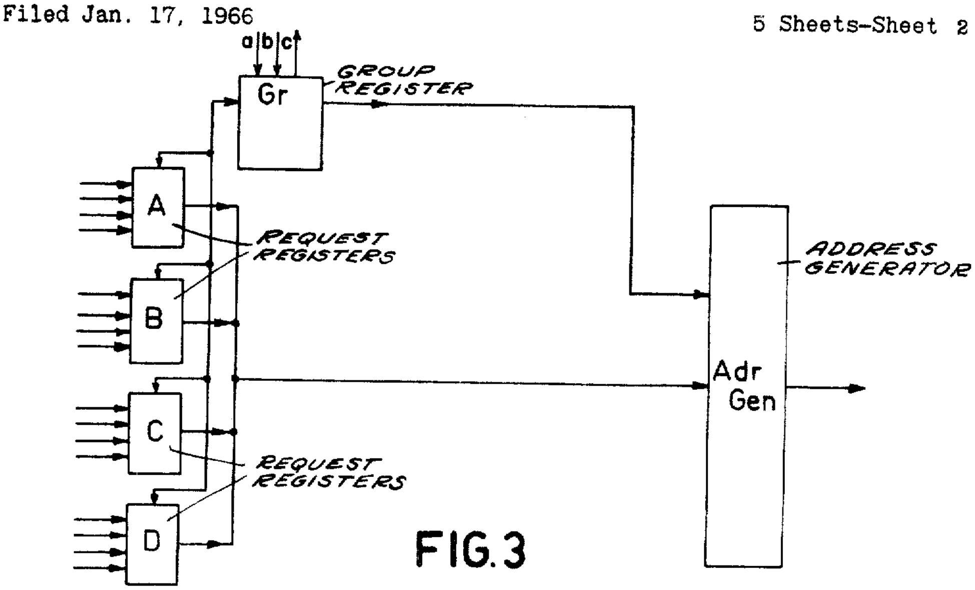
FIG. 3 is a general block schematic view of a circuit arrangement according to the invention.

FIG. 3 shows in outline the circuit arrangement of a priority circuit which can perform the above described function. The circuit arrangement consists of four request registers A, B, C and D, a group registers Gr and an address generator AdrGen.

The request registers A, B, C and D receive the request signals, namely the register A receives all the requests of the group A, the register B all the requests of the group B, and so on. In each of these request registers a bookkeeping is kept up of all the incoming requests and of the fact whether these must still be executed or have already partly been executed but not fully executed. A fully executed request disappears out of the bookkeeping.

When in a group none of the programs has a strong priority over any other program of the said group—which has always been assumed above, but which is of no significance for the invention—at most one interrupted program can occur in each group. This has the advantage that in this case a number of memory locations can be assigned to each request register which are permanently associated with that register to store therein temporarily the data required for a later resumption of the interrupted program. These memory locations will collectively be termed the storage space associated with the request register concerned. The storage space of a request register consequently need contain only sufficient memory locations for temporarily storing the data for resuming one program. An interrupted program can then be resumed by reading the first memory location (the start location) of the storage space for the group concerned, while consequently the storage program can be very simple. So the assembly can be constructed so that, if in a given group a program has to be started or resumed (for which purpose the request register concerned receives a command in the form of a pulse from the group register), the request register transmits a pulse to the address generator AdrGen. As a result of this pulse the latter produces the address of the start location of the program concerned (when a new program has to be started), or produces the address of the start location of the storage space associated with that request register (when a previously interrupted program has to be resumed).

In the group register Gr a bookkeeping is kept up of the groups in which requests for new programs or interrupted programs occur (collectively termed non-executed programs). The group register receives the data for the bookkeeping from the request registers and from the control circuit of the computer.

It is assumed that the control circuit of the computer supplies an "instruction executed" signal in the form of a pulse $a$ when an instruction is completely executed and supplies an "end of program" signal in the form of a pulse $b$ when the instruction just carried out is the last of a program. The pulse $b$ can be derived in known manner from a stop instruction occurring at the end of the program but can be produced also directly in the control circuit itself in the case of programs consisting of a single instruction (for example storage programs).

The group register comprises a logical circuit which after receiving a pulse $a$ (an instruction is fully executed) determines whether:

(1) The program in course of execution must be continued, (2) A new program must be started or an interrupted program be resumed and, if so, to which group this program belongs, (3) A program in course of execution must be interrupted, for which a storage program must be started.

Every request register comprises a logical circuit which, on the command of an "execute program" signal in the form of a pulse supplied by the group register, ensures that a new program of the group concerned is started or a previously interrupted program of that group is resumed. In both cases the logical circuit determines which program of the group concerned is to be started and resumed respectively. The group register ensures that a request register in which no non-executed requests occur never receives an "execute program" signal.

Figure 4:
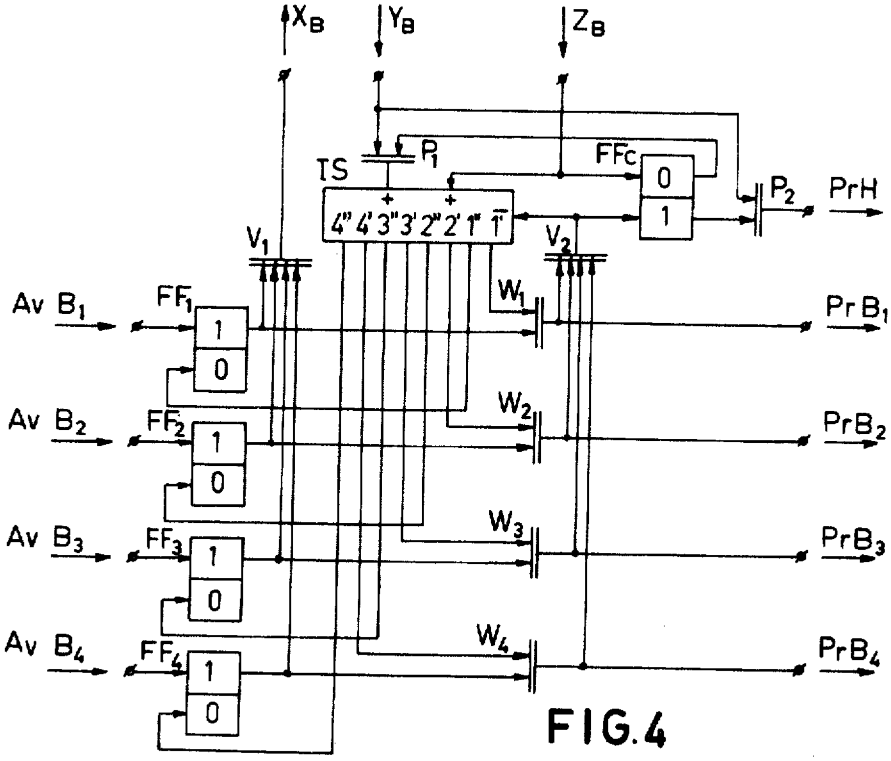
FIG. 4 is a diagram of an embodiment of a request register.

FIG. 4 shows the diagram of a possible embodiment of the request register B. The other request registers can be constructed according to the same principle. The circuit arrangement shown comprises four triggers $FF_1$, $FF_2$, $FF_3$ and $FF_4$ in which the presence or absence of a request is recorded and which for that reason will be termed request recorders, a trigger $FF_c$ in which it is recorded whether the group B contains or does not contain a program which is in course of execution but is not yet fully executed and which for that reason will be termed condition recorder, a counting circuit TS with eight outputs 1′, 1″, 2′, 2″, 3′, 3″, 4′ and 4″ which cyclically produce pulses in the operative condition, two OR-gates $V_1$ and $V_2$ and six AND-gates $W_1$, $W_2$, $W_3$, $W_4$, $P_1$ and $P_2$.

As input signals the request register receives first of all the request signals $AvB_1$, $AvB_2$, $AvB_3$ and $AvB_4$ in the form of non-recurrent pulses when there is a request. From the group register Gr the request register B receives the "execute program" signal in the form of a pulse $Y_B$ when a program of the group B has to be started or resumed and the "end of program" signal in the form of a pulse $Z_B$ when a program of the group B has just been fully executed and has consequently to be written off as a request. It is assumed that the group register Gr is constructed so that when a program has just been fully executed and a new program has to be started or a previously interrupted program has to be resumed. First the "end of program" signal is transmitted to the request register concerned and that only then the "execute program" signal is transmitted to the request register concerned. These two request registers may or may not be the same.

The request register B supplies a permanent or continuous "contains non-executed program" signal $X_B$ to the group register Gr, which signal indicates whether the group B contains a request for a program not started or a program already started but not yet executed or interrupted (signal value 1=high voltage) or that this is not the case (signal value 0=low voltage). Furthermore the request register can supply a pulse $PrB_1$, $PrB_2$, $PrB_3$, $PrB_4$ or $PrH$ to the address generator AdrGen. The result of this pulse is that the address of the start location of the program $B_1$, $B_2$, $B_3$ or $B_4$ and of the storage space of the request register B respectively is generated.

The trigger $FF_i$ ($i=1, 2, 3, 4$) is set in the condition 1 when a request is received for the program $B_i$ and is reset in the condition 0 when the program $B_i$ is fully executed as indicated by the receipt of the "end of program" signal $Z_B$. In fact, this signal contains the information that a program of the group B is executed but in accordance with the above assumption regarding the nature of the priorities this can be no other program than the program of the group B last started.

The trigger $FF_c$ is set in the condition 1 each time a program of the group B is started and is reset in the condition 0 when the "end of program" signal $Z_B$ is received.

The operation of the circuit arrangement can most easily be followed by asking oneself how the request register must react to the various signals supplied by the group register Gr. This is summarized in tabular form below.

(1) An "end of program" signal $Z_B$ is received. The trigger $FF_c$ and that one of the triggers $FF_i$ ($i=1, 2, 3$ or 4) which corresponds to the program just ended must be reset in the condition 0. Which trigger $FF_i$ this is, is indicated by the condition in which the counting circuit TS has stopped.

(2) An "instruction executed" signal $Y_B$ is received.

(2a) The trigger $FF_c$ is in the condition 0 (no interrupted program). The circuit arrangement must determine in a cyclic sequence the next succeeding requested program. This is accomplished by the counting circuit TS. When this turns out to be the program $B_i$, the trigger $FF_c$ must be set in the condition 1 and the signal $PrB_i$ must be transmitted to the address generator AdrGen.

(2b) The trigger $FF_c$ is in the condition 1 (an interrupted program). The circuit arrangement must transmit the signal $PrH$ to the address generator AdrGen.

It is easy to find out that the circuit arrangement performs the said functions indeed.

Let at a given instant the triggers $FF_1$ and $FF_4$ be in the condition 1 (requests for the program $B_1$ and $B_4$) and the trigger $FF_c$ in the condition 0 (no interrupted program), while the counting circuit TS has stopped in the condition 2″ (program of group B last executed is program $B_2$). The signal $X_B$ then has the signal value 1 (the group B contains programs which have not yet started).

When a pulse $Y_B$ is received, the pulse reaches, through the AND-gate $P_1$, the counting circuit TS. This is started by it and successively supplies a pulse to its outputs 3′, 3″, 4′ the former two of which have no effect (because $FF_3$ is in the condition 0) but the last of which passes the AND-gate $W_4$ (because $FF_4$ is the condition 1). The address generator AdrGen consequently receives a pulse $PrB_4$ and thereby produces the address of the start location of program $B_4$ which is started by it.

The pulse passed by the AND-gate $W_4$ also passes the OR-gate $V_2$ as a result of which the trigger $FF_2$ is set in the condition 1 (group B contains a program under execution) and the counting circuit TS is stopped in the condition 4′.

Let then the pulse $Y_B$ be received at an instant that the triggers $FF_1$, $FF_4$ and $FF_c$ are all in the condition 1 (there are requests for the programs $B_1$ and $B_4$, while one of these two programs was already under execution before) and that the counting circuit TS has stopped in the condition 4′ (the interrupted program is the program $B_4$). The pulse $Y_B$ now passes the AND-gate $P_2$ as a result of which the address generator AdrGen receives the signal $PrH$. As a result of this the address is produced of the start location of the storage space associated with the request register B and the interrupted program, in this case the program $B_4$, is thereby resumed again.

The receipt of a pulse $Z_B$ causes the trigger $FF_c$ to be set to the condition 0 and the counting circuit TS to step. If, for example, this had stopped in the condition 4′ (of the group B the program $B_4$ was in course of execution), the counting circuit TS jumps to the condition 4″. The pulse formed as a result at the output 4″ resets the trigger $FF_4$ in the condition 0.

It appears from the above that when a program is started the counting circuit remains in one of the conditions 1′, 2′, 3′, or 4′. As soon as the program concerned is executed (the pulse $Z_B$ is received) the counting circuit jumps to the condition 1″, 2″, 3″ or 4″.

It has been assumed above that the counting circuit in the operative condition performs a cyclic circular counting operation starting with the position in which it has stopped before. Of course the counting circuit may alternatively be constructed so that, after having started, it always starts counting from condition 1′. However, as a result of this the program $B_1$ is given a weak priority over the programs $B_2$, $B_3$, $B_4$, the program $B_2$ is given a weak priority over the programs $B_3$, $B_4$, and the program $B_3$ is given a weak priority over the program $B_4$.

Figure 5:
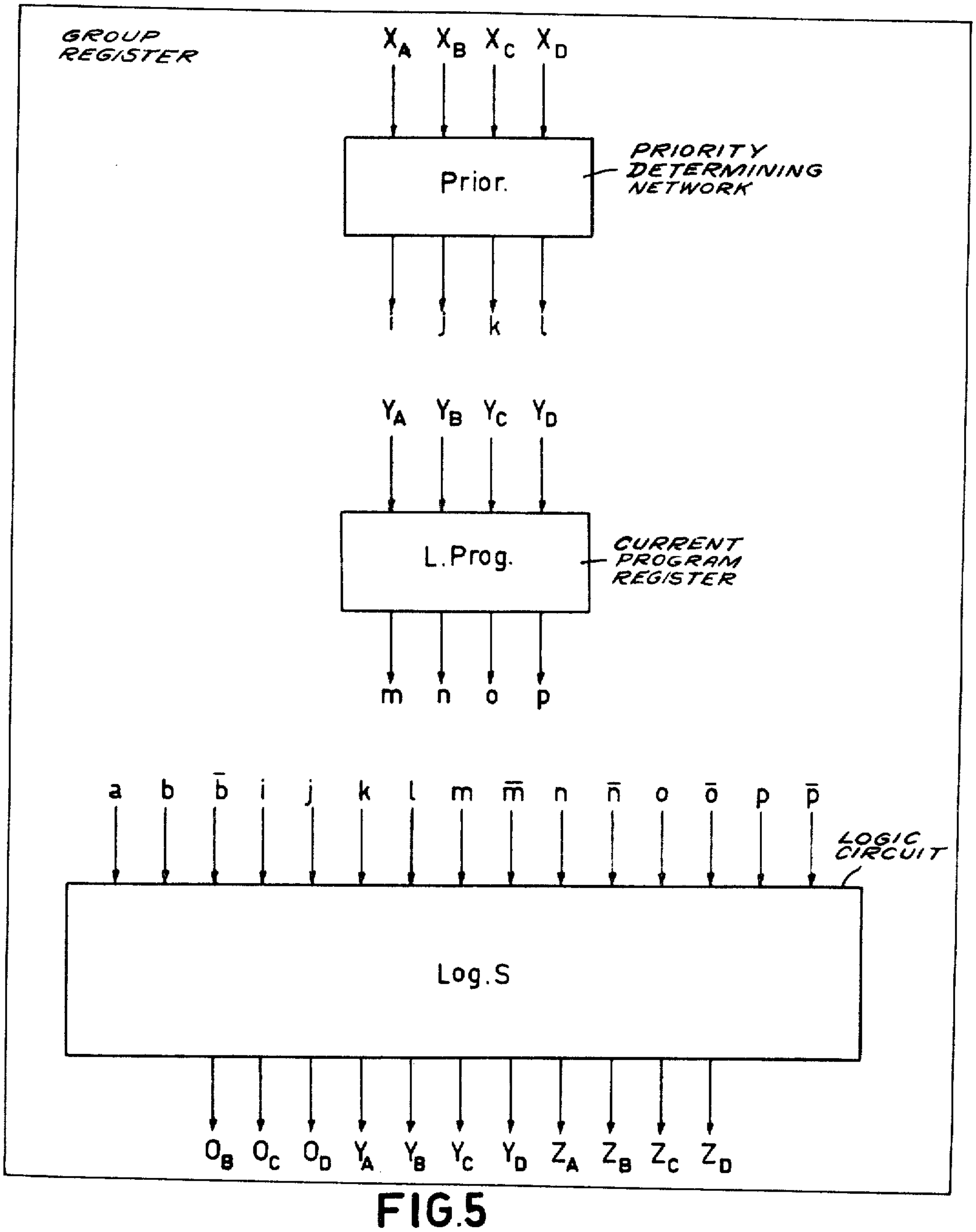
FIG. 5 shows the three main components of which the group register can be built up.

FIG. 5 shows the three main components from which the group register Gr can be constructed, namely a priority-determining network prior, a current program register LProg and a logical circuit Log.S.

The priority-determining network prior receives as input signals the signals $X_A$, $X_B$, $X_C$ and $X_D$ supplied by the request registers and supplies as output signals the signals *i*, *j*, *k* and *l*. It has been assumed in this example that the said signals are all continuous, for example a high or a low voltage. When, for example in the groups B, C and D requests or interrupted programs occur, $X_A$ is a low voltage and $X_B$, $X_C$ and $X_D$ are high voltages. Of the output signals in this case only the signal *j* is a high voltage, that is to say, the group B is indicated as the group having the highest priority.

The current-program register LProg is in fact nothing but a memory. It receives as input signals the non-recurrent signals (pulses) $Y_A$, $Y_B$, $Y_C$, and $Y_D$ supplied by the logical circuit and supplies as output signals the continuous signals *m*, *n*, *o* and *p*. When at a given instant the signal $Y_B$ is received, this contains the information that a program of the group B is started or resumed. Of the output signal *n* must then be a high voltage and *m*, *o* and *p* must be a low voltage.

The logical circuit receives the non-recurrent signals *a* and *b* from the control circuit of the computer. If, however, the control circuit with the next following pulse cycle has not yet received a command to cause a new instruction to be executed, the pulses *a* and *b* are repeated. The logical circuit further receives from the priority-determining network the continuous signals *i*, *j*, *k* and *l* and from the current-program register LProg the continuous signals *m*, *n*, *o* and *p*. In the figure it is assumed that the signals *b*, *m*, *n*, *o* and *p* are each received through two wires, both in the affirmative and in the negative form. This is not essential of course since the negation of a signal can be derived through an invertor or negator from the affirmation thereof. As output signals the logical circuit supplies the non-recurrent signals $O_B$, $O_C$ and $O_D$ (each of which starts a storage program for a program in the groups B, C or D respectively; in the group A a program is never interrupted so that there is no need for a signal $O_A$), and further the non-recurrent signals $Y_A$, $Y_B$, $Y_C$, $Y_D$, $Z_A$, $Z_B$, $Z_C$ and $Z_D$.

The most suitable construction of each of the said three components strongly depends upon the construction of the remaining components of the computer and in particular upon the required speed.

Figure 6:
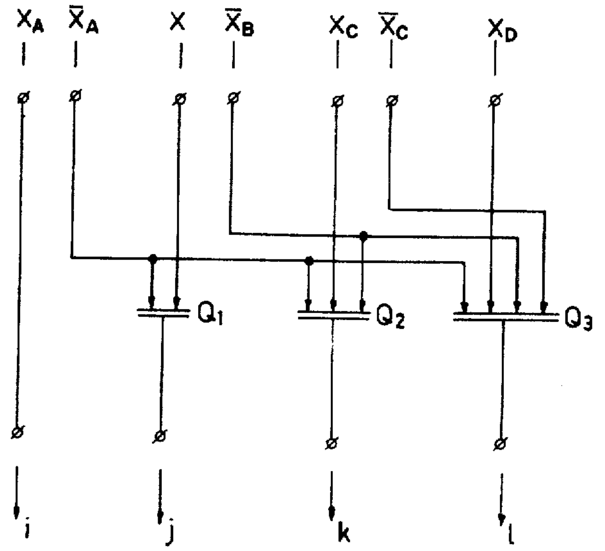
FIGS. 6, 7 and 8 show possible embodiments of the three main components of the group register.

FIG. 6 shows a possible embodiment of a priority-determining network which operates according to another principle than a priority-determining network with a counting circuit as described with reference to FIG. 4 and which is considerably more rapid. In these figures $Q_1$, $Q_2$ and $Q_3$ are three AND-gates. As input signals the circuit arrangement receives the signals $X_A$, $\overline{X}_A$, $X_B$, $\overline{X}_B$, $X_C$, $\overline{X}_C$ and $X_D$ which can be derived from the triggers $FF_1$ (FIG. 4) of the request registers.

Assume that the groups B and C contain a request for a program not yet started or an interrupted program. In that case $\overline{X}_A$, $X_B$ and $X_C$ are a high voltage and $X_A$, $\overline{X}_B$, $\overline{X}_C$ and $X_D$ are a low voltage. It is easy to find out that, in this case, only the signal $j$ is a high voltage.

Figure 7:
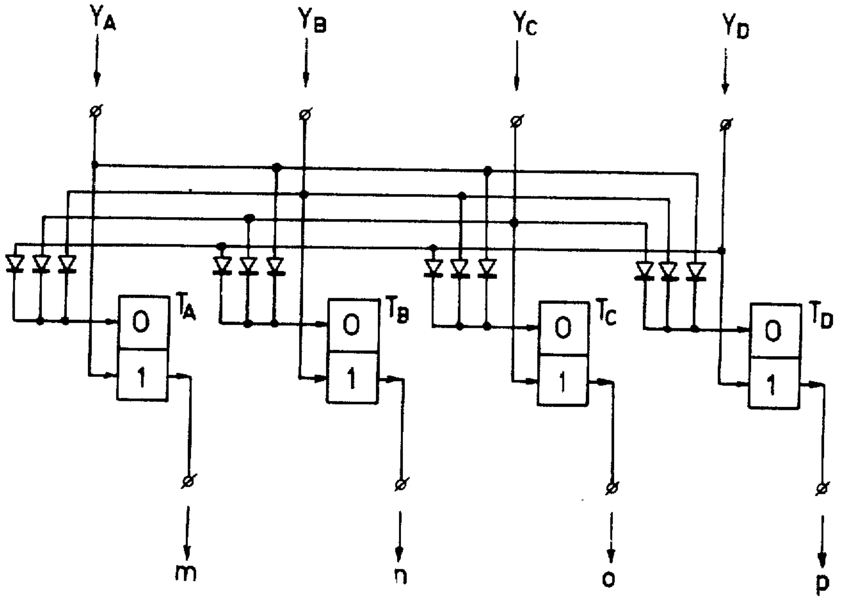

FIG. 7 shows a possible embodiment of the current-program register LProg. This receives as input signals the non-recurrent signals $Y_A$, $Y_B$, $Y_C$ and $Y_D$ supplied by the logical circuit Log.S and supplies as output signals the continuous signals $m$, $n$, $o$ and $p$. A trigger corresponds to each input signal, so also to each output signal and to every group of programs, to the input signal $Y_A$ the trigger $T_A$, to the input signal $Y_B$ the trigger $T_B$, and so on. When, for example, a pulse $Y_B$ is received, which contains the information that in group B a program is started or resumed, the trigger $T_B$ is driven to the condition 1 as a result and the triggers $T_A$, $T_C$ and $T_D$ are driven to the condition 0 independent of the conditions these triggers assumed previously. As a result of this only the continuous output signal $n$ corresponding to the group programs B becomes a high voltage. The diodes serve to decouple the inputs in known manner.

Figure 8:
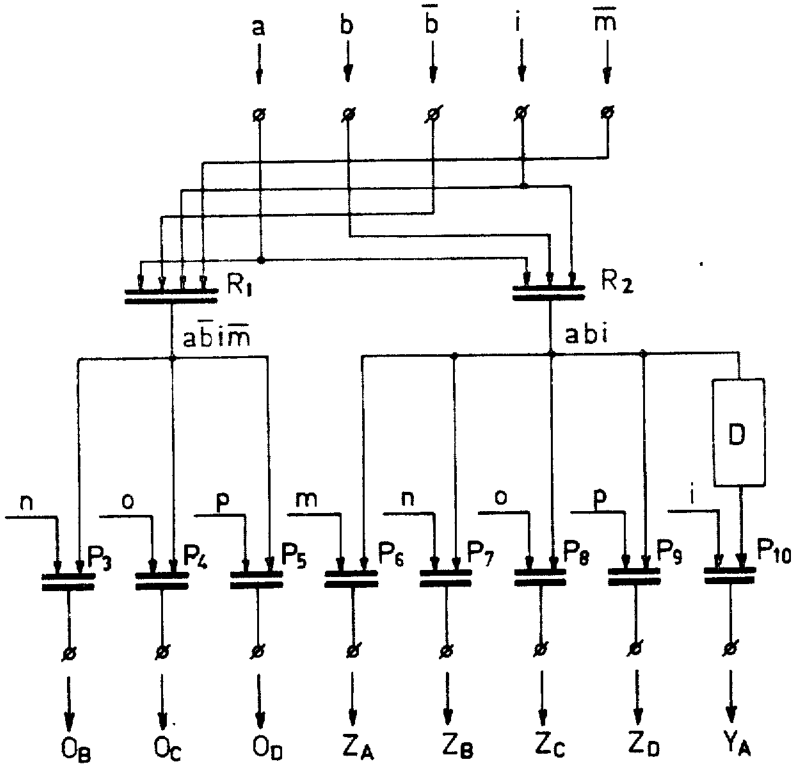

FIG. 8 shows a possible embodiment of part of the logical circuit Log.S which relates to the group A; the components of the logical circuit relating to the remaining groups can be constructed according to the same principle.

In this figure $R_1$, $R_2$, $P_3$, $P_4$ . . . $P_{10}$ are AND-gates and D is a delay member.

The part in question of the logical circuit reacts only to the signals $a$, $b$, $i$ and $m$ in which the non-recurrent signal $a$ and the continuous signal $i$ are received in the affirmative form, the non-recurrent signal $b$ is received both in the affirmative and in the negative form, and the continuous signal $m$ is received only in the negative form. Of importance are, of course, only the cases that a pulse $a$ and a high voltage $i$ are received, $(a=i=1)$. The AND-gates $R_1$ and $R_2$ supply the non-recurrent signals $a\ b\ i\ m$ and $a\ b\ i$.

The following cases can present themselves:

(1) $a=1$, $b=1$, $i=1$, $m=1$; $a\bar{b}i\bar{m}=0$, $a\ b\ i=1$. This case presents itself when a program of the group A is just executed in which two possibilities can occur:

(1a) The group A contains still other requests. In this case the executed program must be written off and the program of the group A whose turn it is must be started. The AND-gate $R_1$ now supplies no pulse but the AND-gate $R_2$ does supply a pulse. This latter pulse passes the AND-gate $P_6$ as a result of which the request register A receives the signal $Z_A$ (the executed program is written off). The signal $X_A$ and as a result also the signal $i$, however, remains a high voltage (group A still contains requests). The pulse delayed by the delay member D consequently passes the AND-gate $P_{10}$ as a result of which the request register A also receives the pulse $Y_A$ (the program whose turn it is is started).

(1b) The group A contains no further requests. In this case the executed program must be written off and the program whose turn it is with the highest lower priority must be started. The AND-gate $R_1$ now supplies no pulse but the AND-gate $R_3$ does supply a pulse. This latter pulse passes the AND-gate $P_6$ as a result of which the request register A receives the signal $Z_A$ (the executed program is written off). As a result of this signal $X_A$ and therewith the signal $i$, changes into a low voltage. The passed pulse delayed by the delay member D is now consequently retained by the AND-gate $P_{10}$, so that the request register A receives no pulse $Y_A$.

During the following pulse cycle the pulses $a$ and $b$ are now repeated while the part of the logical circuit which relates to the request register whose turn it is now is in a condition corresponding to the case 2.

(2) $a=1$, $b=1$, $i=1$, $m=o$; $a\ \bar{b}\ i\ \bar{m}=0$, $a\ b\ i=1$. This case presents itself when a program of a group with a lower priority is just executed. For the parts of the logical circuit relating to the request registers B, C and D this case can also present itself when a part of the logical circuit relating to a group with higher priority has been in the case 1a. The AND-gate $R_1$ now supplies no pulse but the AND-gate $R_2$ does supply a pulse. The pulse supplied by $R_2$ passes the AND-gates $P_7$, $P_8$ or $P_9$ as a result of which the request register concerned receives a pulse Z and the program just executed is written off. When, for example, this program belongs to the group T, $o$ was a high voltage and the AND-gate $P_8$ passes a pulse so that the request register C receives a pulse $Z_C$. The passed pulse delayed by the delay member D now passes the gate $P_{10}$ so that the request register A receives a pulse $Y_A$, as a result of which the program of the group A whose turn it is is started.

(3) $a=1$, $b=0$, $i=1$, $m=1$; $a\ \bar{b}\ i\ \bar{m}=0$, $a\ b\ i=o$. This case presents itself when of a program of group A in course of execution an instruction has fully been executed without that program being executed. In this case the program must be executed further without disturbance, that is to say, the circuit arrangement may not supply a single pulse as the output signal.

This does not take place indeed since neither the AND-gate $R_1$ nor the AND-gate $R_2$ supplies a pulse.

(4) $a=1$, $b=0$, $i=1$, $m=o$; $a\ \bar{b}\ i\ \bar{m}=1$, $a\ b\ i=o$. This case presents itself when of a program of a group with a lower priority in course of execution an instruction is fully carried out without that program being fully executed. So this program must be interrupted in behalf of a program of group A.

The AND-gate $R_1$ now supplies a pulse but the AND-gate $R_2$ supplies no pulse. The pulse supplied by the AND-gate $R_1$ passes the gate $P_3$, $P_4$ or $P_5$, as a result of which the address generator receives a pulse $O_B$, $O_C$ or $O_D$. This pulse starts the storage program for the program concerned in the group B, C or D. As soon as the storage program (one single instruction) is executed, the circuit arrangement receives the pulses $a$ and $b$ while always $i=1$ and $m=0$. So in that case the circuit arrangement arrives in the condition 2.

What is claimed is:

1. A circuit for determining the priority of multi-instruction programs of a computer having a memory control circuit which supplies an "instruction executed" signal and an "end of program" signal, comprising at least two request registers having different levels of priority, a group register and an address generator, means within each of said request registers for receiving a plurality of request signals corresponding to computer programs associated with that request register, means within said group register for receiving the "instruction executed" signal and the "end of program" signal from the computer, said "instruction executed" and "end of program" signals corresponding to programs associated with said request registers, means within said group register for transmitting said "end of program" signal to the request register associated with a concluded program, means within each request register for receiving said "end of program" signal from said group register, means within each said request register for indicating the presence of program request signals to said group register, means within said group register for transmitting an "execute program" signal to the highest priority request register indicating the presence of a program request signal in response to an "instruction executed" signal from said computer, means for transmitting a register identity storage pulse to the address generator in response to the simultaneous occurrence of said "instruction executed" signal from said computer, a program request indication from a request register having a higher priority than the request register corresponding to a program under execution and the absence of an "end of program" signal, whereby the identity of a request register having an interrupted program is stored, means within each of said request registers for receiving said "execute program" signal, means within each request register for supplying a "contains unexecuted program" signal for said group register in response to a program request signal followed by the absence of a corresponding "end of program" signal from the group register, means within said group register for receiving said "contains unexecuted program" signals supplied by each of said request registers, a plurality of bistable request recorder memory elements in each request register and connected to said corresponding means for receiving said request signals, each of said request recorders triggerable to a first state in response to a program request signal and triggerable to a second state in response to said "end of program" signal, said means for supplying a "contains unexecuted program" signal further comprising means connected to each of said request recorders in each of said request registers for generating said "contains unexecuted program" signal in response to the first state of any of said corresponding request recorders, a bistable condition recorder in each of said request registers and triggerable to a first stable state in response to the concurrence of the first stable state of a request recorder of said request register and an "execute program" signal from the group register, said condition recorder being triggerable to a second stable state in response to an "end of program" signal from said computer memory control circuit, said condition recorder thereby being in a first stable state in response to an initiated and uncompleted program, means within each request register for transmitting to said address generator a program address pulse corresponding to each of the request recorders within each request register in response to the concurrence of an "execute program" signal and the second state of said corresponding condition recorder, means within each request register for transmitting a request register address readout pulse to said address generator in response to the concurrence of an "execute program" signal and said first state of said corresponding condition recorder, means comprising said address generator for generating the address of the first instruction of a corresponding program in response to each program address pulse from said request register, and means comprising said address generator for generating the address of the interrupted instruction of said request register in response to said request register address readout pulse from each corresponding request register.

References Cited

UNITED STATES PATENTS

| | | | |
|---|---|---|---|
| 3,029,414 | 4/1962 | Schrumpf | 340—172.5 |
| 3,048,332 | 8/1962 | Brooks et al. | 340—172.5 |
| 3,079,082 | 2/1963 | Scholten et al. | 340—172.5 |
| 3,208,048 | 9/1965 | Kilburn et al. | 340—172.5 |
| 3,221,309 | 11/1965 | Benghial | 340—172.5 |
| 3,222,647 | 12/1965 | Strackey | 340—172.5 |
| 3,226,694 | 12/1965 | Wise | 340—172.5 |
| 3,239,819 | 3/1966 | Masters | 340—172.5 |
| 3,309,672 | 3/1967 | Brun et al. | 340—172.5 |
| 3,331,055 | 7/1967 | Betz et al. | 340—172.5 |

PAUL J. HENON, Primary Examiner

PAUL R. WOODS, Assistant Examiner